United States Patent [19]

Tarazaga Carrasco

[11] Patent Number: 5,878,768
[45] Date of Patent: Mar. 9, 1999

[54] ONE WAY VALVE FOR INFLATABLES AND PROCESSES FOR PRODUCTION AND INCORPORATION IN THE INFLATABLE

[76] Inventor: Juan Jose Tarazaga Carrasco, Passatge Salvador Espriu, 2 3° 2$^a$, Terrassa, Spain

[21] Appl. No.: 860,840
[22] PCT Filed: Sep. 10, 1996
[86] PCT No.: PCT/ES96/00170
  § 371 Date: Jun. 10, 1997
  § 102(e) Date: Jun. 10, 1997
[87] PCT Pub. No.: WO97/13566
  PCT Pub. Date: Apr. 17, 1997

[30] Foreign Application Priority Data

Oct. 10, 1995 [ES] Spain ..................... 9501951

[51] Int. Cl.$^6$ ................. A63H 27/10; F16K 15/20; F16K 15/14
[52] U.S. Cl. ............... 137/15; 446/224; 137/848; 137/223
[58] Field of Search ................. 137/223, 844, 137/846, 848, 15; 446/224, 220

[56] References Cited

U.S. PATENT DOCUMENTS

| | | |
|---|---|---|
| 3,230,663 | 1/1966 | Shabram ................. 137/846 |
| 3,523,563 | 8/1970 | Mirando ................. 137/846 |
| 3,584,671 | 6/1971 | Kampa ................. 137/223 X |
| 4,911,674 | 3/1990 | Cole ................. 446/224 |
| 4,917,646 | 4/1990 | Kieves . |
| 5,188,558 | 2/1993 | Barton et al. . |
| 5,248,275 | 9/1993 | Mc Grath et al. ................. 446/224 |
| 5,295,892 | 3/1994 | Felton . |
| 5,456,716 | 10/1995 | Iversen et al. ................. 137/846 X |
| 5,595,521 | 1/1997 | Becker ................. 446/224 |

FOREIGN PATENT DOCUMENTS

| | | |
|---|---|---|
| 2641597 | 7/1990 | France . |
| 1020862 | 4/1992 | Spain . |

Primary Examiner—John Rivell
Assistant Examiner—Meredith H. Schoenfeld
Attorney, Agent, or Firm—Darby & Darby

[57] ABSTRACT

The valve consists of a strip -1- onto which two coplanar strips -3, 4- are welded separated by an opening -5-. Production of the valve takes a strip -11- onto which two strips -12, 13- are welded separated by a space -5-. The valve obtained -16- is welded onto a laminar -17-, which forms part of the inflatable, with a hole -19- which has to coincide with the valve opening -5-. Next the first sheet is welded to a second laminar -21- which forms the inflatable. The same process obtains a double valve with a single entry.

22 Claims, 3 Drawing Sheets

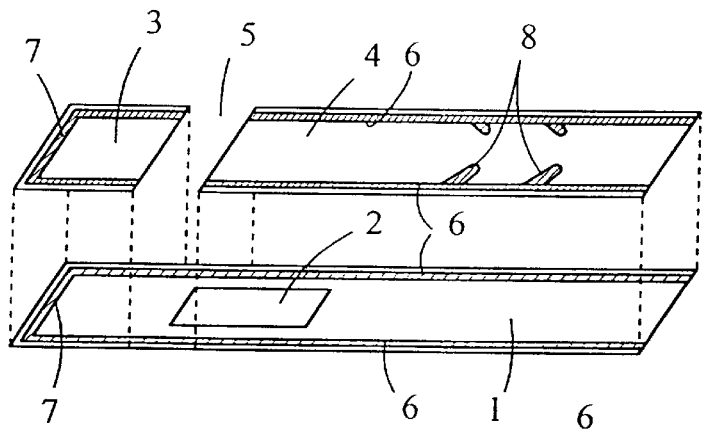
FIG. 1
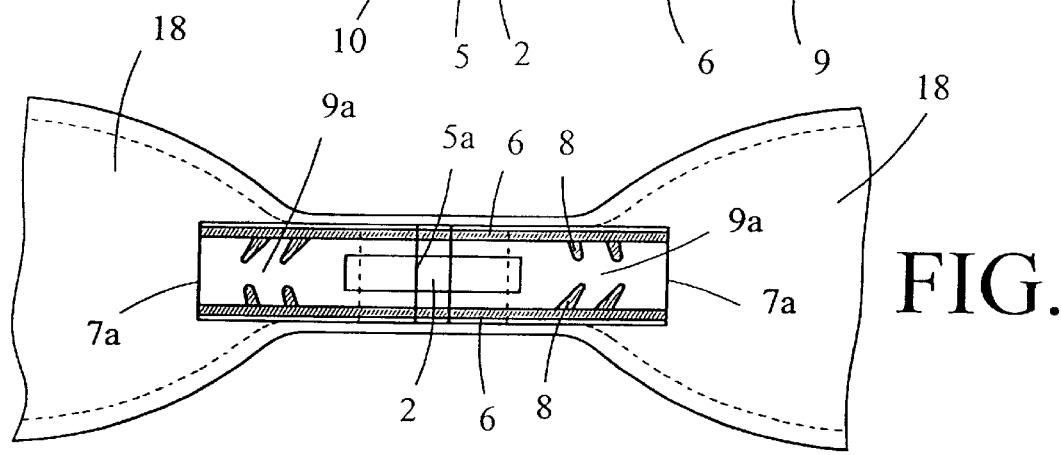
FIG. 2
FIG. 3
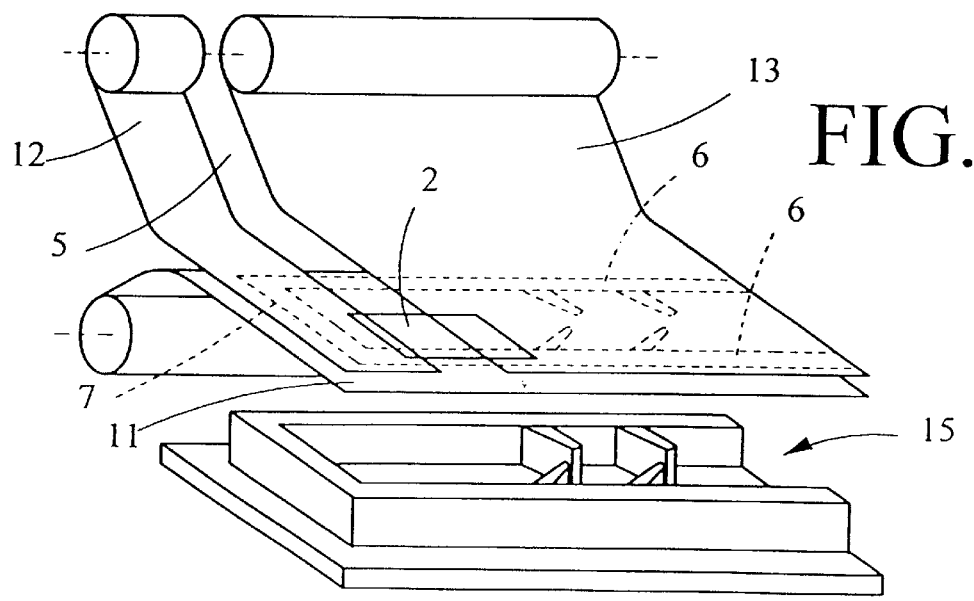
FIG. 4

ONE WAY VALVE FOR INFLATABLES AND PROCESSES FOR PRODUCTION AND INCORPORATION IN THE INFLATABLE

This invention concerns a one way valve for inflatables such as balloons with at least one internal layer of heat weldable material. This valve is of the type which allows the input of gas into the inflatable and shuts off the valve as a result of the bending action of the pressure of the gas inside the balloon. This invention also concerns a manufacturing process for the valve and a process for fitting it into the balloon. From this point on we shall call "balloon" any ball or inflatable to which this valve can be fitted.

BACKGROUND OF THE INVENTION

A valve type which is already known consists of two laminar strips of different lengths which are joined together by lengthwise weld lines. This forms a laminar valve shaped like a tube with one end open for the intake of gas which is accessible from the outside and one outlet end opening into the inside of the balloon. On the entry end of the valve there is a flap made up of an extension of one of the strips. This protects the balloon sheet like material to which the valve is welded. Moreover, in the area next to the end of the valve input one of the strips has an non-weldable covering which reaches a location close to the flap. Thus, when the valve is being welded to one of the sheets which make up the balloon the opening is not blocked.

One problem with this type of valve is that the protective flap on the end of the entry opening does not sufficiently prevent damages to the balloon when the inflation nozzle is used.

Another problem concerns the correct placing of the prefabricated valve into one of the internal faces of the balloon in order to weld together the valve and the sheets which make up the balloon. These problems with positioning make it difficult to obtain a fast and efficient production process.

DESCRIPTION OF THE INVENTION

In order to solve the problems explained above, the valve which the object of this invention was designed, along with the production process and method of incorporation into the balloon.

The valve is of the type which allows the input of gas into the inflatable and shuts off the same as a result of the pressure of the gas inside the balloon folding or bending over the exit. A valve of this type consists of two heat weldable laminar strips welded together by lines of welding which form a laminar valve shaped like a tube with one intake end, for gas input, accessible from the outside and one output end communicating with the inside of the balloon. Strips of weld cause internal strangulation in the valve to prevent the return of gas. One of the strips has an non-weldable covering that coincides with the valve opening. Based on the premises explained above, the valve is characterised by the fact that on one of the sides of the first strip in the area with non-weldable covering a second and third coplanar strips are welded, spaced out lengthwise, so that there is a crosswise space between them which coincides in part with the non-weldable area. This space is the opening for the entry of gas. The second and third strips respectively reach the end of the first strip.

One option is for the second and third strips to be of different lengths and to be welded to the first strip by lengthwise lines and a transverse line coinciding with the end of the valve closest to the entry opening. On the other side of this opening the two strips are welded by sloping lines which form a strangulated passage.

A second option is for the second and third strips to be of the same length so that the space for the entry is in the middle of them. The second and third strips are welded to the first strip by lengthwise lines and by two groups of sloping lines on either side of the entry opening which form various strangulated passages thus creating a double valve with open ends and a single entry. This double valve forms a nexus between two inflatables.

The production process for the valves and the method of incorporating them into a balloon is characterised by the fact that on one side of a first continuous strip of heat weldable material, with the inside with equally spaced non-weldable areas, second and third heat weldable coplanar strips are placed, spaced out so that the space between them coincides at least in part with the non-weldable areas. Once the strips have been superimposed, are joined together with, at least, lines of heat weld placed transversely to the direction of the strips and with sloping lines forming strangulated passages. Once the strips have been welded they are cut transversely to obtain the valves. Next, these valves are placed in sequence on the inside of a heat weldable strip on which regularly spaced holes have been made so that the valve openings coincide with the holes. Then, the valves are joined to the strip by lines of heat weld placed on the non-weldable area. Next, a second heat weldable strip is joined to the valve strip by lines of weld which go around the balloon. The process is finished by stamping each of the welded strips to obtain balloons with valves inside.

BRIEF DESCRIPTION OF THE DRAWINGS

Drawings have been included to this description to facilitate understanding of the same. An example case has been given of creating a valve, the processes of production and incorporation of the valve in the balloon.

FIG. 1 is a perspective view of the valve parts;

FIG. 2 is a plan view of the valve;

FIG. 3 is a plan view of a double valve;

FIG. 4 is a perspective schematic view showing the basic part of the production process for the valves;

DESCRIPTION OF A PREFERRED EMBODIMENT

Figure 8:
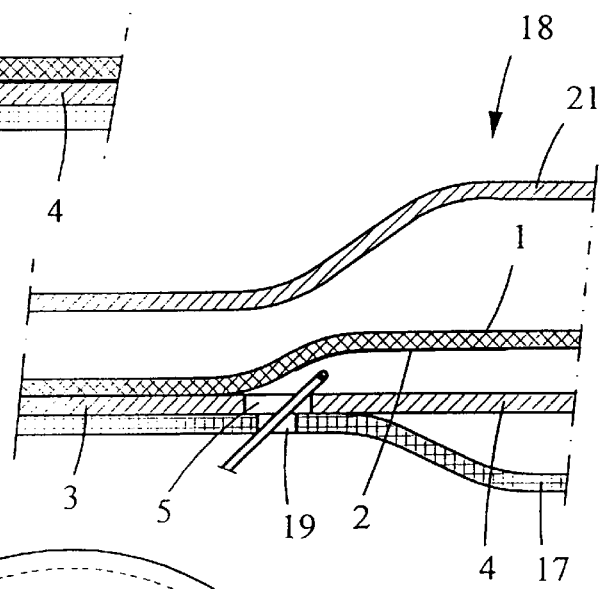
FIG. 8 is a view similar to the previous view showing an inflation nozzle inserted into a valve incorporated in a balloon.

The valve consists in the drawings of a first laminar strip -1- of heat weldable material with an area -2- of non-weldable material. On one side of strip -1- the other two strips of different lengths -3- and -4- are welded with a space -5- between them which is an opening for gas and which partly coincides with area -2-. Strips -3- and -4- are welded to strip -1- by lengthwise lines -6-, a transverse line -7- and pairs of sloping lines -8- which make a strangulated passage -9- of known type. It is important to point out the transverse line -7- which closes one end of the valve. Between the opening -5a- and line -7- there is a double flap formed -10- for strengthening (FIG. 2) which prevents the balloon from being damaged when a nozzle is inserted for inflating (FIG. 8).

A second version is a double valve shown in FIG. 3 which is similar to that shown in FIG. 2 but whose basic characteristic is that it has two strangulated openings -9a-, a middle opening -5a- which is common to the two valves, and open ends -7a-. This valve is used as a nexus between two balloons -18-.

FIG. 4 shows the main stage in the production process for valves such as those described. This process involves one continuous strip -11- of heat weldable material which includes equally spaced areas -2- of non-weldable material. On one of the sides of strip -11- two other strips of heat weldable material -12- and -13- are juxtaposed. The are separated by a space -5- of the width of the valve opening to be obtained. This space partly coincides with the non-weldable areas -2-.

Once the strips have been juxtaposed they are heat welded with an electrode -15- which welds the strips in sequence on lines -6-, -7-, -8- according the version in FIGS. 1 and 2, or only lines -6-, -8- for the version in FIG. 3. Then, the welded strips are cut transversely and in sequence to obtain the valves -16-.

Figure 6:
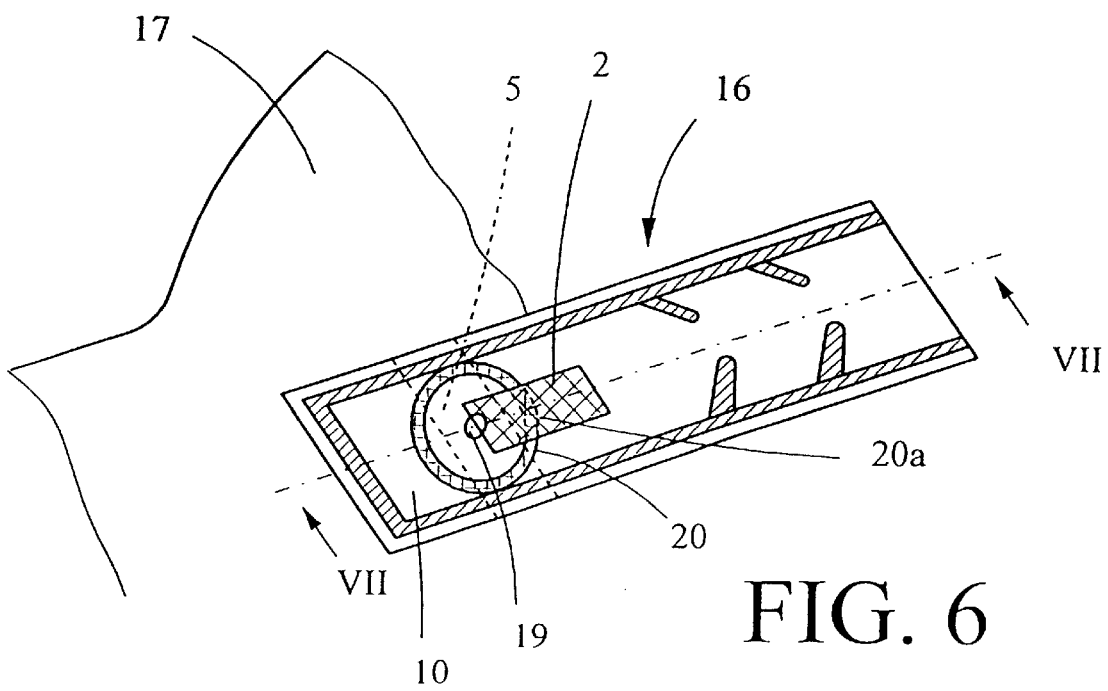
FIG. 6 shows a valve incorporated into a laminar of the balloon.
Figure 7:
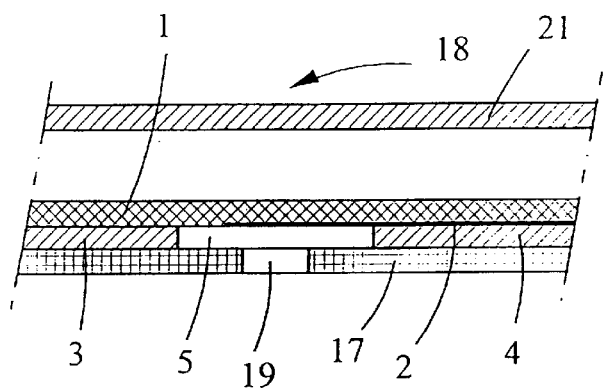
FIG. 7 is a sectional view through the cut VII—VII of FIG. 6.

The valves are placed in sequence, either on a continuous strip or freely, onto one side of a heat weldable sheet -17- which is part of a balloon -18-. Each valve must be placed so that the entry -5- coincides with a hole -19- made in the sheet -17- (FIG. 6). Next, the valve is welded -16- onto the sheet -17- by a line of weld -20- which partly coincides with the non-weldable area -2- leaving a strip -20a- unwelded so that the valve is not blocked off inside. Once the valve has been welded to the sheet -17- a second heat weldable sheet -21- is welded which is part of the balloon -18- and the strips are joined together by a line of weld -22- which goes around the contour of the balloon. Whilst welding, the sheets can be cut to obtain the balloon with the valve incorporated.

The processes of production and incorporation of the valve in the balloon are very simple since opening -5- is obtained without having to cut or stamp the laminas. They simply have to be kept apart during the welding process (FIG. 4) making it easy for the continuous separation -5- between the strips to coincide with the non-weldable areas -2-. The process of incorporating the valve into the balloon has the advantage that the positioning of the valve -16- on the laminar -17- is very easy, simply coinciding opening -5- with hole -19-. This process can be carried out automatically in sequence thus reducing costs.

It is important to point out that the internal pressure of the gas inside the balloon presses the sheets together which make up the valve -16- and presses them against the inside wall of the balloon in area -20- thus forming an additional closure to that of the valve.

Figure 5:
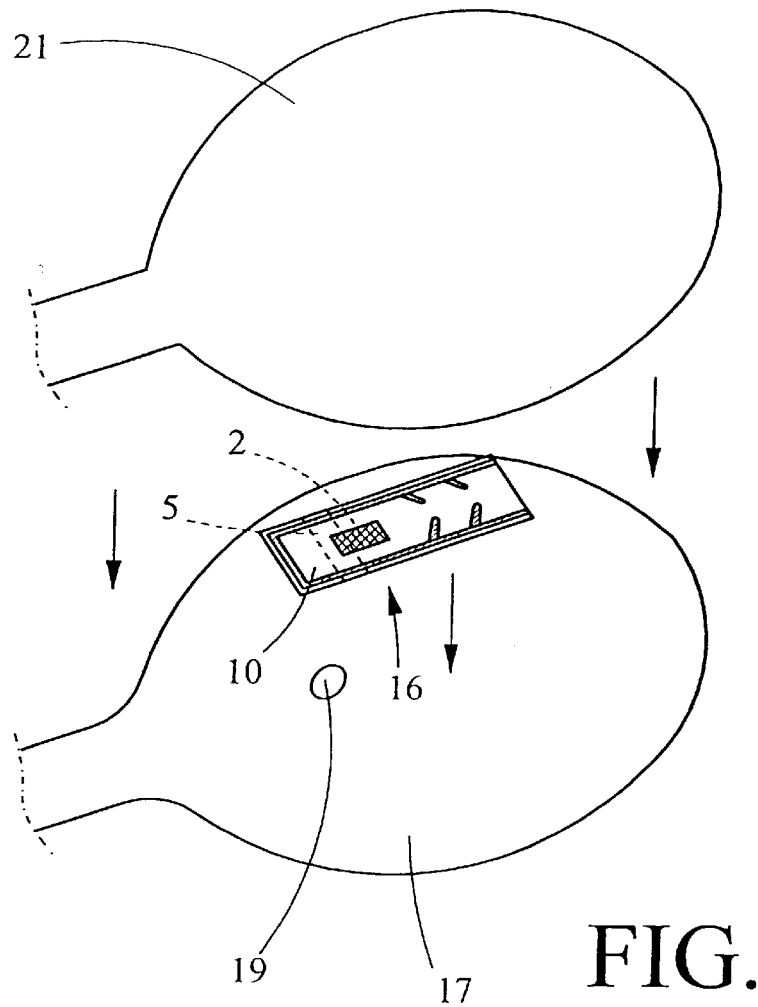
FIG. 5 is a perspective schematic view showing the first stage of the process of incorporating the valve in a balloon in production.
Figure 9:
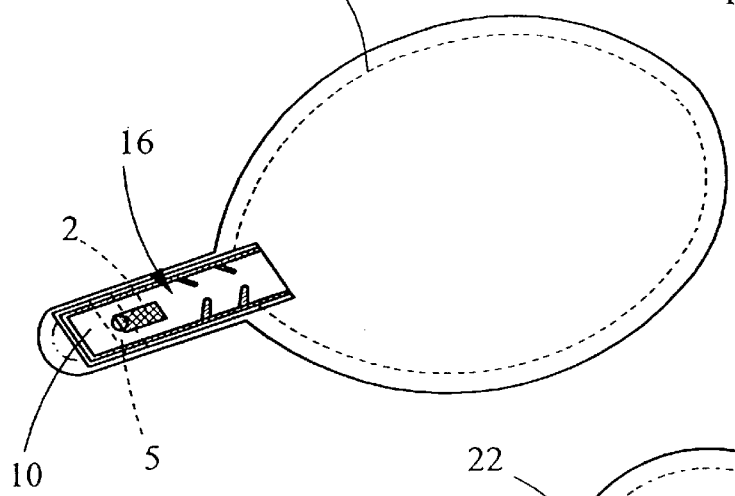
FIGS. 9 and 10 are schematic views of different balloons with valves incorporated.
Figure 10:
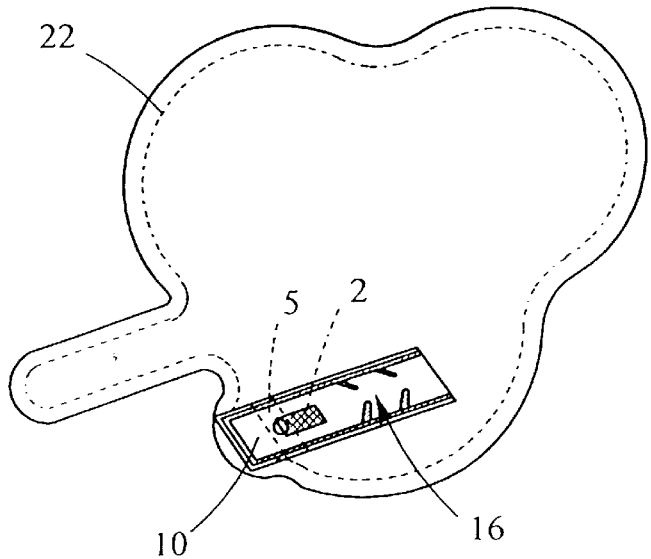

It is also important that with the process described above it is possible to obtain single valves (FIG. 2) or double (FIG. 3) by simply changing the widths of the strips. The characteristics of the valves and the process of obtaining them and incorporating them into the balloon means they can be placed in the central part of the balloon (FIG. 5), in the neck (FIG. 9) or close to its periphery (FIG. 10).

I claim:

1. A self-sealing valve for inflatable objects comprising:
   a valve body having opposite ends, said valve body comprising:
   a first valve body strip having longitudinal edges and a central axis;
   a second valve body strip shorter in length than said first valve body strip and having longitudinal edges and a central axis, said second valve body strip being disposed on top of said first valve body strip so that their respective central axes extend substantially parallel to one another, said first and second valve body strips being welded together along their respective longitudinal edges to define a first hollow valve space, wherein said first and second valve body strips are aligned at one end of said valve body to define a discharge opening and said first valve body strip extends in a longitudinal direction beyond said shorter second valve body strip at the opposite end of said valve body to form an inlet opening; and
   a third valve body strip having longitudinal edges and a transverse edge, said third valve body strip disposed at the opposite end of said first valve body strip, projecting above said second valve body strip and separated relative to said second valve body strip to define an intermediate space therebetween in fluid connection with the inlet opening, and said third valve body strip being welded at least along its longitudinal edges to said first valve body strip to define a second hollow valve space.

2. A self-sealing valve in accordance with claim 1, wherein the transverse edge of said third valve body strip proximate the opposite end of said first valve body strip and extending across the central axis of said first valve body strip is welded to said first valve body strip.

3. A self-sealing valve in accordance with claim 1, wherein said second and third valve body strips are substantially equal in length.

4. A self-sealing valve in accordance with claim 1, wherein said second and third valve body strips differ in length.

5. A self-sealing valve in accordance with claim 1, further comprising means for preventing adhesion of at least said first and second valve body strips disposed in an area of the inlet opening at least at one of said first and second valve body strips.

6. A self-sealing valve in accordance with claim 5, wherein said means for preventing adhesion extends inside the hollow valve space in a direction towards the discharge opening.

7. A self-sealing valve in accordance with claim 5, wherein said means for preventing adhesion is a strip arranged on at least one of said first and second valve body strips.

8. A self-sealing valve in accordance with claim 5, wherein said means for preventing adhesion covers at least a portion of the inlet opening.

9. A self-sealing valve in accordance with claim 5, wherein said means for preventing adhesion extends over the whole inlet opening and inside the first hollow valve space defined between said first and second valve body strips and the second hollow valve space defined between said first and third valve body strips.

10. A self-sealing valve in accordance with claim 1, further comprising at least one constriction disposed in the first hollow valve space of said valve body between the inlet opening and the discharge opening for reducing a cross-section of the first hollow valve space.

11. A self-sealing valve in accordance with claim 10, wherein said constriction comprises two pairs of welds arranged in succession in a direction of flow of an inflation medium between said first and second valve body strips.

12. A self-sealing valve in accordance with claim 11, wherein said two pairs of welds extend from welding lines defined along the longitudinal edges of said first and second valve body strips welded together to delimit the first hollow valve space.

13. A self-sealing valve in accordance with claim 12, wherein said two pairs of welds are oriented at a forward incline from the welding lines between said first and second valve body strips and extend in the direction of flow of the inflation medium.

14. A self-sealing valve in accordance with claim 1, wherein said first, second and third valve body strips are substantially rectangular in shape.

15. A self-sealing valve in accordance with claim 1, wherein said first, second and third valve body strips are substantially equal in width.

16. A self-sealing valve in accordance with claim 1, wherein said inflatable object is a balloon.

17. A method for manufacturing self-sealing valves comprising the steps of:

placing on one side of a first continuous weldable tape at least a second continuous weldable tape and a third continuous weldable tape, wherein said second tape is separated relative to said third tape by an intermediate space; and welding said three tapes to each other along welding lines extending substantially parallel to each other to form a first hollow valve space having an inlet opening and a discharge opening between said first and second tapes, and a second hollow valve space formed between said first and third tapes.

18. A method in accordance with claim 17, wherein said welding step further comprises welding said first and third tapes to one another along an additional welding line extending across the welding lines forming the second hollow valve space and disposed at an end of the second hollow valve space remote from said first hollow valve space.

19. A method in accordance with claim 17, wherein said placing step further comprises the step of providing a means for preventing adhesion of the tapes at an area of the intermediate space on one of said first tape and said third tape prior to arranging said second tape with respect to said first tape.

20. A method in accordance with claim 17, further comprising the step of successively cutting out substantially rectangular hollow valve bodies from the welded tapes.

21. A method in accordance with claim 17, wherein said welding step further comprises the step of welding constrictions in the second hollow valve space between said first and third tapes.

22. A method in accordance with claim 17, wherein said welding step comprises hot welding said tapes.

* * * * *